United States Patent [19]

Shimizu et al.

[11] Patent Number: 4,563,359

[45] Date of Patent: Jan. 7, 1986

[54] COATED COMPOUND SEASONING COMPOSITIONS

[75] Inventors: Tetsuzi Shimizu, Yokohama; Tadashi Mizutani, Ebina; Hideko Furukawa, Tokyo, all of Japan

[73] Assignee: Ajinomoto Company, Limited, Tokyo, Japan

[21] Appl. No.: 651,080

[22] Filed: Sep. 17, 1984

Related U.S. Application Data

[63] Continuation of Ser. No. 447,635, Dec. 7, 1982, abandoned.

[30] Foreign Application Priority Data

Dec. 7, 1981 [JP] Japan ................................ 56-196674
Jul. 27, 1982 [JP] Japan ................................ 57-130621

[51] Int. Cl.⁴ .............................................. A23L 1/228
[52] U.S. Cl. ...................................... 426/96; 426/650
[58] Field of Search ........................................ 426/650

[56] References Cited

U.S. PATENT DOCUMENTS

| 2,500,919 | 3/1950 | Cahn ................................ 426/650 X |
| 2,829,056 | 4/1958 | Kemmerer ....................... 426/650 X |
| 3,039,880 | 6/1962 | Kawamura et al. ............. 426/650 X |
| 3,340,069 | 9/1967 | Matsuda et al. ................. 426/650 X |
| 3,615,598 | 10/1971 | Funakoshi et al. ............. 426/650 X |
| 3,711,301 | 1/1973 | Asogawa et al. ................ 426/650 X |
| 4,471,002 | 9/1984 | Buchholz et al. ................... 426/650 |

FOREIGN PATENT DOCUMENTS 9440 of 1909 United Kingdom ................ 426/650

Primary Examiner—Joseph Golian
Attorney, Agent, or Firm—Oblon, Fisher, Spivak, McClelland & Maier

[57] ABSTRACT

A compound seasoning composition comprising a glutamate salt mixture wherein the gram equivalent quantities of sodium, potassium and calcium ions of said salt are within the ranges of sodium:potassium=0–3.5:1, calcium:potassium=0–1.5:1 and the number of moles of glutamic acid:the total gram equivalent number of potassium, sodium and calcium=0.1–1.2:1.

4 Claims, No Drawings

COATED COMPOUND SEASONING COMPOSITIONS

This is a continuation of application Ser. No. 447,635 filed Dec. 7, 1982.

BACKGROUND OF THE INVENTION

DESCRIPTION OF THE PRIOR ART

This invention relates to all-purpose compound seasoning compositions which contain three components, i.e. potassium L-glutamate, sodium L-glutamate and calcium L-glutamate, and which have a taste intensity equivalent to that of sodium L-glutamate, but which intensity is manifested as a more complicated, richer and wider taste spread in the mouth, and are thus highly desirable as seasonings.

Since the discovery of L-glutamic acid as a taste component, sodium L-glutamate (MSG) has been widely used as an all-purpose seasoning. Moreover, combinations of MSG which nucleic acid taste intensifying substances such as IMP, GMP and like or combinations of these taste components with other amino acids, organic acids and the like are generally employed as compound seasonings.

MSG is widely used as a component of seasonings and is frequently employed as a component in compound seasonings, where glutamic acid salts other than MSG, such as lysine glutamate, arginine glutamate, calcium glutamate, potassium glutamate, ornithine glutamate, ammonium glutamate and the like, are limited in their taste intensifying properties, odors, physical properties and other aspects when used individually. Therefore, their utilization is very limited, for example to the enhancement of the enzyme stability of nucleic acid taste intensifying substances by adding a calcium L-glutamate to a nucleic acid seasoning (Japanese Patent Publication No. 11732/1968). Another example is the enrichment of seasonings by the addition of such nutrients as the lysine salt, the arginine salt, or the ornithine salt of L-glutamic acid or the like (Japanese Patent Publication No. 18486/1961).

SUMMARY OF THE INVENTION

Briefly, the present invention is a compound seasoning composition in which the gram equivalent ratio of sodium, potassium and calcium is within the range of sodium:potassium=0–3.5:1 and calcium:potassium=0–1.5:1 and in which the mole number of glutamic acid:total gram equivalent number of potassium, sodium and calcium is 0.1–1.2:1.

DESCRIPTION OF THE PREFERRED EMBODIMENTS

The present invention involves the utilization of glutamic acid salts other than MSG. It has been discovered that by mixing L-glutamic acid, potassium, sodium and calcium in specific ratios, the drawbacks inherent to the respective L-glutamic acid salts can be eliminated and products having taste intensifying properties with full complexity, width and fullness, which properties MSG itself does not possess, can be obtained. The presented composition is highly useful as an all-purpose seasoning.

In the present invention, sodium, potassium and calcium components are blended in amounts such that the gram equivalent ratio of sodium, potassium and calcium is within the range of sodium:potassium=0–3.5:1 and calcium:potassium=0–1.5:1, while the mole number of glutamic acid:total gram equivalent number of potassium, sodium and calcium ratios is 0.1–1.2:1. Preferably, either the sodium:potassium ratio is 1:4 to 5:2, the calcium:total of potassium, sodium and calcium ratio is 0–0.3:1 and the mole number of glutamic acid:total gram equivalent number of potassium, sodium and calcium ratio is 0.4–1.2:1, or the calcium:potassium ratio is 0–1.5:1, the sodium:total of potassium, sodium and calcium ratio is 0–0.15:1 and the mole number of glutamic acid:total gram equivalent number of potassium, sodium and calcium ratio is 0.4–1.2:1.

Glutamic acid derived by any satisfactory process can be used in the preparation of the present composition. Exemplary compositions include fermentation, acid decomposition, and the like. The sodium, potassium and calcium ions can be derived from any suitable source such as the glutamates, chlorides, hydroxides, phosphates, carbonates, organic acid salts, fish, dried fish, walnuts, egg, meat and the like.

A preferred example of the present seasoning comprises 30–95% by weight of potassium L-glutamate, 5–70% by weight of sodium L-glutamate and 0–30% by weight of calcium L-glutamate.

The compound seasonings of the present invention can be obtained merely by mixing the necessary ingredients in a variety of forms such as crystals, fine crystalline powders, solutions, suspensions and the like and, if necessary, drying the mixture. Potassium L-glutamate is highly hygroscopic. Accordingly, in preferred compositions where the relative amount of potassium L-glutamate is high, the rheological properties of the products are adversely affected or the components of the compositions tend to be classified meaning that the components of the composition are not homogeneously mixed throughout the product. Moreover, there are some problems with the physical properties of the compositions, such as, for example, that while sodium L-glutamate is very extensively soluble in water, it is somewhat slow in the rate at which it dissolves in soy sauce and like seasonings. Studies in formulating suitable compositions have shown that the drawbacks in these physical properties can be eliminated by preparing the composition by a process which comprises coating, while pelletizing, potassium L-glutamate with sodium L-glutamate and calcium L-glutamate.

Finely divided crystals of sodium L-glutamate and calcium L-glutamate can be obtained by pulverizing crystals of sodium or calcium L-glutamate, or by directly drying a purified liquor in the production of sodium or calcium L-glutamate. Particles of a size of 200 μm or less are preferred for a satisfactory coating.

On the other hand, the potassium L-glutamate which is used is crystals which have not been pulverized as above. Since potassium L-glutamate exhibits hygroscopic and deliquescent properties, it is preferred that the surface area of the particles remain small in order to improve the hygroscopicity of the product. Crystals having a particle size of about 0.3–2 mm are preferably employed.

The above three components are pelletized with a binder. Almost any kind of binder can be used with the exception of those which might adversely affect the taste and physical properties of the product. For example, water and other water-soluble binders such as an aqueous sodium L-glutamate solution, an aqueous calcium L-glutamate solution, an aqueous dextrin solution, starch glue, an aqueous nucleic acid type taste intensifying substance solution or the like can be used.

The amount of the binder present in the composition varies depending on the pelletizing method, and in general, approximately 3-20% by weight of the above-described various aqueous solutions may be added to the components of the composition.

Any pelletizing method utilized for powder and crystalline starting materials may be employed to pelletize the present composition, and the method selected depends on the shape, size, strength and the like of the intended granules. For example, stirred coating pelletization, extrusion pelletization, fluidized pelletization and tumbling pelletization are preferred. Stirred coating pelletization is a method which comprises mixing the starting material crystals, if necessary, by adding a binder solution to the mixture, and thereafter mixing the starting materials and then drying the same. If necessary, pulverization is conducted. Extrusion pelletization is a method which involves the addition of a binder solution to the powder or crystals of the starting materials and the extrusion of a mixture through a screen or predetermined holes of a die. Fluidized pelletization is a pelletizing method which involves fluidizing the starting materials in a fluidized bed in a gas stream, and simultaneously generating appropriate amounts of nuclei by adding moisture and growing the particles themselves. Tumbling pelletization is a method which involves tumbling the starting materials in a vibrating tray or a rotary cylinder, and then spraying the binder solution thereby agglomerating the particles from which the particles grow.

The compound seasoning granules pelletized by the above methods are dried and sifted as needed, and the pellets thus obtained rapidly dissolve in seasonings, such as soy sauce, and water and accordingly the seasoning effect is instantaneously manifested. Also, the granules exhibit excellent flowing characteristics with less of a crystalline feeling and thus foods in which the seasoning is incorporated exhibit soft and natural qualities as foods which cannot be expected with other crystalline products. From the aspect of taste intensity, there is exerted an excellent and unique effect, that is, the respective components are uniformly mixed to provide a novel compound seasoning having unprecedented full complexity and a rich taste.

As for the starting materials which were used in the experiments and examples hereinbelow, those materials generally possessing water of crystallization were employed such as, for example, potassium glutamate monohydrate, sodium glutamate monohydrate, calcium glutamate tetrahydrate, sodium citrate dihydrate, sodium malate hemihydrate, calcium lactate pentahydrate, and the like. Also as far as the other starting materials are concerned, those in generally available form were employed.

EXPERIMENT 1

Using the lysine salt, potassium salt, sodium salt, ammonium salt and calcium salt of L-glutamic acid, the taste intensifying properties of individual salts were evaluated singly and in combinations of two or more.

For the evaluations, the individual salts or salts combinations were dissolved in 0.7% saline in an amount of 2 g each as free glutamic acid per liter to prepare the respective samples. Each sample was subjected to an organoleptic test by a gustatory panel consisting of 20 well-trained members for intensity of taste, bitterness, saltiness, acidity, complexity and fullness, width of taste and overall taste preference.

As shown in Table 1, in addition to taste, calcium L-glutamate was bitter, and potassium L-glutamate also was very slightly bitter. Sodium L-glutamate was somewhat salty. However, when the three components were mixed in a gram equivalent ratio of sodium to potassium to calcium such that the sodium to potassium ratio was 0-3.5:1 and the calcium to potassium ratio was 0-1.5:1, which is the compositional range of the present invention, the deficiencies of the individual salts were overcome, while the advantages of each salt were maintained. That is, (1) the salt mixture was not bitter to the taste; (2) the complexity, the width of taste and the fullness were intensified; and (3) the salt mixture was harmonious with table salt.

TABLE 1

Taste Intensifying Properties and Palatabiliity of Various Glutamic Acid Salts Singly or in Combination
The sale of the intensity of each taste is expressed relative to the intensity of taste of MSG taken as 100.

| Sample | Lysine L-Glutamate % | Potassium L-Glutamate % | Sodium L-Glutamate % | Ammonium L-Glutamate % | Calcium L-Glutamate % | Intensity of Tastiness | Intensity of Bitterness |
|---|---|---|---|---|---|---|---|
| 1 | 100 | | | | | 100 | 3 |
| 2 | | 100 | | | | 100 | 4 |
| 3 | | | 100 | | | 100 | 0 |
| 4 | | | | 100 | | 100 | 0 |
| 5 | | | | | 100 | 100 | 10 |
| 6 | | | 50 | | 50 | 100 | 3 |
| 7 | | 50 | 30 | | 20 | 100 | 0 |

| Sample | Intensity of Saltiness | Intensity of Acidness | Intensity of Complexicity & Mouthfulness | Width of Taste | Palatability (Preference for the overall taste) |
|---|---|---|---|---|---|
| 1 | 0 | 0 | 0 | 0 | Slightly bitter and thus slightly undesirable |
| 2 | 0 | 0 | 5 | 5 | Bitter and thus slightly undesirable |
| 3 | 10 | 0 | 0 | 0 | Good |
| 4 | 0 | 10 | 0 | 0 | Had an acid taste and thus undesirable |
| 5 | 0 | 0 | 3 | 3 | Bitter and thus undesirable |
| 6 | 3 | 0 | 1 | 1 | Bitter and thus slightly undesirable |

TABLE 1-continued

Taste Intensifying Properties and Palatabiliity of Various
Glutamic Acid Salts Singly or in Combination
The sale of the intensity of each taste is expressed relative
to the intensity of taste of MSG taken as 100.

| 7 | 2 | 0 | 3 | 3 | Had fullness and thus was very good |

EXPERIMENT 2

By employing varied ratios of L-glutamic acid, sodium, potassium and calcium blended together in combinations of three or more as sodium L-glutamate, L-glutamic acid, potassium chloride, potassium carbonate, potassium phosphate, calcium chloride, calcium lactate, calcium carbonate and calcium hydroxide, the taste intensifying properties of the salt mixtures were evaluated.

For the evaluations, the individual combinations were dissolved in 0.7% saline in an amount of 2 g each as free glutamic acid per liter, to prepare the samples. Each sample was subjected to an organoleptic test by a gustatory panel consisting of 20 well-trained members, for taste, bitterness, saltiness, complexity, fullness, width of taste, impure taste, and preference of taste.

As is clear from Table 3, when Na/K exceeds 5 and Ca/K is less than 2, the composition is slightly more bitter than sodium L-glutamate, but otherwise its taste intensifying properties are more or less comparable to those of sodium L-glutamate. When Na/K is 3.5 or less and Ca/K exceeds 2, the composition is much more bitter and has an impure taste relative to sodium L-glutamate and thus is not preferable. When Na/K is less than 3.5 and Ca/K is less than 0.5, the composition is slightly more bitter than sodium L-glutamate, but still not bad in taste, has stronger complexity and has greater fullness than sodium L-glutamate. Further, the width of the taste is more intensified which is much preferred from the aspect of palatability.

TABLE 2

| | Na/K | Ca/K | Glu/(K + Na + Ca) |
|---|---|---|---|
| 1. MSG 187 g, Glutamic acid 2673 g, K$_2$CO$_3$ 397 g, CaCO$_3$ 575 g | 0.17 | 2.00 | 1.05 |
| 2. MSG 187 g, K$_2$CO$_3$ 138 g, CaCl$_2$ 222 g | 0.50 | 2.00 | 0.14 |
| 3. MSG 187 g, K$_2$HPO$_4$ 87 g, CaCO$_3$ 100 g | 1.00 | 2.00 | 0.25 |

TABLE 2-continued

| | Na/K | Ca/K | Glu/(K + Na + Ca) |
|---|---|---|---|
| 4. MSG 187 g, KH$_2$PO$_4$ 23 g, K$_2$HPO$_4$ 15 g, CaCO$_3$ 33 g | 2.93 | 1.93 | 0.50 |
| 5. MSG 187 g, Glutamic acid 29 g, KCl 14 g, Ca(OH)$_2$ 14 g | 5.32 | 2.01 | 0.76 |
| 6. MSG 187 g, Glutamic acid 400 g, K$_2$CO$_3$ 370 g, Ca(OH)$_2$ 201 g | 0.19 | 1.01 | 0.32 |
| 7. MSG 187 g, KCl 75 g, Calcium lactate 152 g | 0.99 | 0.98 | 0.33 |
| 8. MSG 187 g, K$_2$CO$_3$ 13 g, Calcium lactate 26 g | 5.31 | 0.90 | 0.74 |
| 9. MSG 187 g, Glutamic acid 158 g, KH$_2$PO$_4$ 381 g, K$_2$HPO$_4$ 244 g, Ca(OH)$_2$ 80 g | 0.18 | 0.39 | 0.25 |
| 10. MSG 187 g, Glutamic acid 198 g, K$_2$HPO$_4$ 171 g, Ca(OH)$_2$ 27 g | 0.51 | 0.37 | 0.69 |
| 11. MSG 187 g, KCl 76 g, CaCl$_2$ 22 g | 0.98 | 0.39 | 0.41 |
| 12. MSG 187 g, Glutamic acid 25 g, K$_2$HPO$_4$ 29 g, Calcium glutamate 20 g | 3.00 | 0.39 | 0.84 |
| 13. MSG 187 g, Glutamic acid 11 g, K$_2$CO$_3$ 14 g, CaCO$_3$ 4 g | 4.93 | 0.39 | 0.84 |

Therefore, ratios of sodium to potassium of 0–3.5:1 and calcium to potassium of 0–1.5:1 are the optimum ranges for obtaining a compound seasoning which has fullness and complexity as well as width of taste.

TABLE 3

| | Taste Intensity | Bitterness Intensity | Salt Intensity | Intensity of Complexity and Fullness | Width of Taste | Intensity of Taste Impurity |
|---|---|---|---|---|---|---|
| 1 | 100 | 40 | 5 | 5 | 0 | 40 Bad taste |
| 2 | 100 | 15 | 5 | 5 | 0 | 15 Bad taste |
| 3 | 100 | 15 | 8 | 5 | 0 | 20 Bad taste |
| 4 | 100 | 5 | 8 | 5 | 0 | 0 Bad taste |
| 5 | 100 | 2 | 10 | 0 | 0 | 0 Not different from MSG |
| 6 | 100 | 10 | 2 | 10 | 5 | 5 Good taste |
| 7 | 100 | 5 | 5 | 5 | 5 | 0 Good taste |
| 8 | 100 | 2 | 8 | 0 | 0 | 0 Not different from MSG |
| 9 | 100 | 10 | 2 | 5 | 5 | 5 Good taste |
| 10 | 100 | 5 | 2 | 5 | 5 | 0 Good taste |
| 11 | 100 | 5 | 8 | 5 | 5 | 0 Good taste |
| 12 | 100 | 3 | 8 | 5 | 5 | 0 Good taste |
| 13 | 100 | 1 | 10 | 0 | 0 | 0 Not different from MSG |
| MSG | 100 | 0 | 10 | 0 | 0 | 0 |

*The taste intensity is taken as 100.

Compositions were prepared from potassium chloride, sodium chloride, calcium chloride, potassium glutamate, sodium glutamate and calcium glutamate in the optimum range of potassium, sodium and calcium and in varied proportions such that the mole number of glutamic acid relative to the total gram equivalent number of potassium, sodium and calcium was 0.05, 0.1, 0.2, 0.4, 0.7 or 1.0. These compositions were then dissolved in distilled water in an amount of 2 g each as free glutamic acid per liter to prepare individual samples. The samples were subjected to an organoleptic test by a panel of 20 well-trained members for taste, bitterness, saltiness, complexity, fullness, width of taste, impure taste, and preference of taste.

As is clear from Tables 4–6, where the mole number of glutamic acid relative to the total gram equivalent number of potassium, sodium and calcium was 0.05 or less, the bitterness and saltiness characteristics relative to the taste of the inorganic potassium, sodium and calcium ions were intensified and thus the taste was bad. When the mole number of glutamic acid relative to the total gram equivalent number of potassium, sodium and calcium ions was 0.1 or higher, the taste was good. Also, when salts other than potassium, sodium and calcium glutamates or glutamic acid were employed in combination with the above starting materials, a good taste was obtained. However, when the mole number of glutamic acid exceeded the total gram equivalent number of potassium, sodium and calcium, an impure taste other than potassium, sodium and calcium is imparted to the products and also the pH fluctuates. The upper limit for the mole number of glutamic acid relative to the total gram equivalent number of potassium, sodium and calcium for practical use is desirably 1.2. Therefore, when the sodium to potassium ratio is 0–3.5:1, the calcium to potassium ratio is 0–1.5:1 and the mole number of glutamic acid to total gram equivalent number of potassium, sodium and calcium ratio is 0.1–1.2:1, the optimum ranges are achieved for obtaining a compound seasoning having fullness and complexity as well as width of taste.

Experiment 3

Six compositions (Sample Nos. 6, 7, 9, 10, 11 and 12) within the optimum range were chosen among the samples prepared in Experiment 2, dissolved in 0.7% saline in an amount of 2 g each as free glutamic acid per liter to prepare individual samples. The samples were subjected to an organoleptic test by a gustatory panel of 20 well-trained members for complexity and fullness, width of taste, and taste preference on the basis of comparisons by pairs of test panel members.

As is clear from Table 7, compositions 10 and 11 within the ranges of sodium:potassium=1:4–5:2 and calcium-total of potassium, sodium and calcium=-0–0.3:1 have more intensified complexity and fullness and also exhibit a wider taste than compositions 7 and 12. In the comparison between compositions 10 and 11 and the comparison between compositions 7 and 12, there was no composition which was evaluated as significantly differing from the others. Compositions 6 and 9 within the ranges of calcium:potassium=0–1.5:1 and sodium:total of potassium, sodium and calcium=-0–0.15:1 were also evaluated as very similar to each other. However, their thickness of taste, complexity and fullness were stronger than those of compositions 10 and 11, respectively. Nevertheless, preference was equally split between compositions 6 and 9, and compositions 10 and 11, since the complexity and fullness were too strong. However, compositions 6 and 9 were much

TABLE 4

Na/K = 1/5, Ca/K = 2/5

| | Formulation | | | | | | Evaluation | | | | |
|---|---|---|---|---|---|---|---|---|---|---|---|
| Glu/K + Na +Ca | KCl | NaCl | CaCl$_2$ | Potassium Glutamate | Sodium Glutamate | Calcium Glutamate | Taste | Bitterness | Complexity & Fullness | Impure Taste | Remarks |
| 0.05 | 43.2 | 7.0 | 13.9 | 10.2 | 0 | 0 | 100 | 40 | 10 | 70 | Bad taste |
| 0.1 | 39.5 | 7.0 | 13.9 | 20.3 | 0 | 0 | 100 | 40 | 10 | 30 | Good taste |
| 0.2 | 32.0 | 7.0 | 13.9 | 40.6 | 0 | 0 | 100 | 30 | 10 | 20 | Good taste |
| 0.4 | 17.1 | 7.0 | 13.9 | 81.2 | 0 | 0 | 100 | 10 | 10 | 10 | Good taste |
| 0.7 | 0 | 2.9 | 13.9 | 127.9 | 13.1 | 0 | 100 | 10 | 5 | 5 | Good taste |
| 1.0 | 0 | 0 | 0 | 127.9 | 22.4 | 50.5 | 100 | 5 | 10 | 5 | Good taste |

TABLE 5

Na/K = 1, Ca/K = 2/5

| | Formulation | | | | | | Evaluation | | | | |
|---|---|---|---|---|---|---|---|---|---|---|---|
| Glu/(K + Na + Ca) | KCl | NaCl | CaCl$_2$ | Potassium Glutamate | Sodium Glutamate | Calcium Glutamate | Taste | Bitterness | Complexity & Fullness | Impure Taste | Remarks |
| 0.05 | 27.5 | 24.6 | 8.9 | 10.2 | 0 | 0 | 100 | 50 | 10 | 10 | Bad taste |
| 0.1 | 23.8 | 24.6 | 8.9 | 20.3 | 0 | 0 | 100 | 30 | 10 | 10 | Good taste |
| 0.2 | 16.4 | 24.6 | 8.9 | 40.6 | 0 | 0 | 100 | 20 | 5 | 5 | Good taste |
| 0.4 | 1.5 | 24.6 | 8.9 | 81.2 | 0 | 0 | 100 | 10 | 5 | 2 | Good taste |
| 0.7 | 0 | 8.2 | 8.9 | 85.3 | 52.4 | 0 | 100 | 5 | 5 | 2 | Good taste |
| 1.0 | 0 | 0 | 0 | 85.3 | 78.5 | 32.3 | 100 | 5 | 10 | 2 | Good taste |

TABLE 6

Na/K = 3, Ca/K = 2/5

| | Formulation | | | | | | Evaluation | | | | |
|---|---|---|---|---|---|---|---|---|---|---|---|
| Glu/(K + Na + Ca) | KCl | NaCl | CaCl$_2$ | Potassium Glutamate | Sodium Glutamate | Calcium Glutamate | Taste | Bitterness | Complexity & Fullness | Impure Taste | Remarks |
| 0.05 | 39.5 | 11.1 | 12.8 | 10.2 | 0 | 0 | 100 | 20 | 10 | 5 | Bad taste |
| 0.1 | 35.8 | 11.1 | 12.8 | 20.3 | 0 | 0 | 100 | 10 | 10 | 2 | Good taste |
| 0.2 | 28.3 | 11.1 | 12.8 | 40.6 | 0 | 0 | 100 | 5 | 5 | 0 | Good taste |
| 0.4 | 13.4 | 11.1 | 12.8 | 81.2 | 0 | 0 | 100 | 5 | 5 | 0 | Good taste |
| 0.7 | 0 | 4.1 | 12.8 | 117.7 | 22.4 | 0 | 100 | 2 | 2 | 0 | Good taste |
| 1.0 | 0 | 0 | 0 | 117.7 | 35.5 | 46.5 | 100 | 2 | 2 | 0 | Good taste | preferred over compositions 7 and 12. Therefore, the above ranges of sodium:potassium=1:4–5:2 and calcium:total of potassium, sodium and calcium=0–0.3:1 or calcium:potassium=0–0.8:1 and sodium:total of potassium, sodium and calcium=0–0.15:1 are more preferred ranges among the optimum ranges for obtaining a compound seasoning having an even further intensified fullness and complexity as well as a wider taste.

TABLE 7

| | | 6 | 7 | 9 | 10 | 11 | 12 |
|---|---|---|---|---|---|---|---|
| | Which is more intense in complexity and fullness | — | | | | | |
| 6 | Which is more intense in width of taste | — | | | | | |
| | Which is preferred | — | | | | | |
| | Which is more intense in complexity and fullness | 4* | — | | | | |
| 7 | Which is more intense in width of taste | 4* | — | | | | |
| | Which is preferred | 5* | — | | | | |
| | Which is more intense in complexity and fullness | 10 — | 15* | — | | | |
| 9 | Which is more intense in width of taste | 11 — | 15* | — | | | |
| | Which is preferred | 12 — | 15* | — | | | |
| | Which is more intense in complexity and fullness | 5* | 15* | 5* | — | | |
| 10 | Which is more intense in width of taste | 5* | 15* | 5* | — | | |
| | Which is preferred | 10 — | 16* | 8 — | — | | |
| | Which is more intense in complexity and fullness | 5* | 15* | 5* | 9 — | — | |
| 11 | Which is more intense in width of taste | 4* | 15* | 5* | 8 — | — | |
| | Which is preferred | 9 — | 15* | 8 — | 9 — | — | |
| | Which is more intense in complexity and fullness | 5* | 8 — | 5* | 5* | 5* | |
| 12 | Which is more intense in width of taste | 5* | 10 — | 5* | 5* | 5* | — |
| | Which is preferred | 5* | 10 — | 5* | 5* | 5* | — | n = 20

The present seasoning composition not only is applicable as an all-purpose seasoning, but also, by combining it with nucleic acid type taste intensifying substances such as IMP, GMP, and the like, a product can be prepared which exhibits synergistic taste, and thus may be applied as an all-purpose seasoning having a high potency taste. Furthermore, the present composition is widely applicable in seasonings, foods and the like in combination with other materials such as amino acids, organic acid, and natural flavor sources.

The compound seasoning of this invention may be obtained merely by mixing crystals, fine crystalline powders, powdery granules, solutions, suspensions and the like of the respective components and, if necessary, drying.

Having generally described this invention, a further understanding can be obtained by reference to certain specific examples which are provided herein for purpose of illustration only and are not intended to be limiting unless otherwise specified.

EXAMPLE 1

As shown in Table 8 below, the components of three compositions were uniformly mixed to prepare compound seasonings A, B and C.

TABLE 8

| Compound Seasoning | Potassium L-Glutamate Monohydrate | Sodium L-Glutamate Monohydrate | Calcium L-Glutamate Tetrahydrate |
|---|---|---|---|
| A | 65 | 11 | 25 |
| B | 44 | 39 | 17 |
| C | 17 | 77 | 6 |

Thereafter, the respective compound seasonings were tested by a two-point comparison with MSG using clear soup as the evaluation system by a panel consisting of 20 well-trained members.

The clear soup was prepared from the composition set forth in Table 9. The organoleptic test was conducted for the qualities of taste, intensity, intensity of complexity and preference of the overall taste of the clear soup.

The results are set forth in Table 10. The soups to which the compound seasonings A and B had been added had a more intensified complexity and were significantly preferred in comparison to the soup to which MSG alone had been added.

TABLE 9

| | Clear Soup |
|---|---|
| Compound Seasoning A* | 2.14 g |
| (or Compound Seasoning B)* | (2.10 g) |
| (or Compound Seasoning C)* | (2.04 g) |
| (or MSG) | (2 g) |
| Water | 1 l |
| Flakes of dried bonito | 10 g |
| Tablet salt | 8 g |
| Soy sauce | 3 ml |

*The amount added was changed so as to make the content of the L-glutamic acid salt equivalent to the content of L-glutamic acid in the control MSC.

TABLE 10

| | Test No. 1 | | Test No. 2 | | Test No. 4 | |
|---|---|---|---|---|---|---|
| | Compound Seasoning A | MSG | Compound Seasoning B | MSG | Compound Seasoning C | MSG |
| Which is more intense in taste | 9 | 11 | 10 | 10 | 9 | 11 |
| Which is more intense in complexity | 17*** | 3 | 15* | 5 | 13 | 7 |
| Which is more preferable in overall taste | 16* | 4 | 15* | 5 | 12 | 8 |

*Significantly different at a level of significance of 5%.
**Significantly different at a level of significance of 1%.

EXAMPLE 2

As shown in Table 11 below, the components of four compositions were uniformly mixed to prepare compound seasonings D–G.

TABLE 11

| Compound Seasoning | Potassium L-Glutamate Monohydrate | Sodium L-Glutamate Monohydrate | Calcium L-Glutamate Tetrahydrate |
|---|---|---|---|
| D | 69 | 31 | 0 |
| E | 54 | 24 | 22 |
| F | 41 | 19 | 41 |

TABLE 11-continued

| Compound Seasoning | Potassium L-Glutamate Monohydrate | Sodium L-Glutamate Monohydrate | Calcium L-Glutamate Tetrahydrate |
|---|---|---|---|
| G | 29 | 13 | 58 |

Thereafter, the respective compound seasonings were tested by a two-point comparison with MSG using miso soup as the evaluation system by a panel consisting of 20 well-trained members.

The miso (fermented soybean paste) soup was prepared from the composition set forth in Table 12. The organoleptic test was conducted for the qualities of taste intensity, the intensity of complexity and preference of the overall taste of the miso soup.

The results are set forth in Table 13. Those to which the compound seasonings D, E and F had been added respectively had a more intensified complexity and were significantly preferred in comparison to the soup to which MSG alone had been added. That to which G had been added, although having a more intensified complexity was significantly less preferred, in comparison to that to which MSG alone had been added.

TABLE 12

|  | Miso Soup |
|---|---|
| Compound Seasoning D* | 2.12 g |
| (or Compound Seasoning E)* | (2.12 g) |
| (or Compound Seasoning F)* | (2.14 g) |
| (or Compound Seasoning G)* | (2.14 g) |
| (or MSG) | (2 g) |
| IN | 0.05 g |
| Water | 1 l |
| Flakes of dried bonito | 10 g |
| Miso | 90 g |

*The amount added was changed so as to make the content of the L-glutamic acid salt equivalent to the content of L-glutamic acid in the control MSG.

TABLE 13

|  | Test No. 1 Compound MSG Seasoning D | | Test No. 2 Compound MSG Seasoning E | | Test No. 3 Compound MSG Seasoning F | | Test No. 4 Compound MSG Seasoning G | |
|---|---|---|---|---|---|---|---|---|
| What is more intense in taste | 10 | 10 | 11 | 9 | 9 | 11 | 9 | 11 |
| Which is more intense in complexity | 16* | 4 | 15* | 5 | 16* | 4 | 17* | 3 |
| Which is more preferable in overall taste | 16* | 4 | 15* | 5 | 16* | 4 | 3* | 17 |

*Significantly different at a level of significance of 5%.

EXAMPLE 3

As shown in Table 14 below, the components of four compositions were mixed, dissolved, neutralized with HCl and spray dried to prepare compound seasonings H–K.

TABLE 14

| Compound Seasoning | Amount Incorporated |
|---|---|
| H | Na$_2$CO$_3$ 53 g, Glutamic acid 547 g, Calcium carbonate 370 g, Calcium hydroxide 201 g |
| I | MSG 187 g, Potassium carbonate 397 g, Calcium carbonate 575 g |
| J | Na$_2$CO$_3$ 53 g, Glutamic acid 171 g, Potassium chloride 14 g, Calcium hydroxide 14 g |
| K | MSG 187 g, Glutamic acid 14 g, Dipotassium hydrogenphosphate 17 g, Calcium hydroxide 7 g |

Thereafter, the respective compound seasonings were tested by a two-point comparison with MSG using miso soup as the evaluation system by a panel consisting of 20 well-trained members.

The miso soup was prepared from the composition set forth in Table 15. The organoleptic test was conducted for the qualities of taste intensity, intensity of complexity and preference of the overall taste of the miso soup.

The results are set forth in Table 16. That to which the compound seasoning H had been added had a more intensified complexity and was significantly preferred in comparison to the soup to which MSG alone had been added. The soup to which compound seasoning I had been added had a taste worse than the soup to which MSG alone had been added and was significantly less preferred. The soups to which compound seasonings J and K had been added did not show any significant difference from MSG.

TABLE 15

|  | Miso Soup |
|---|---|
| Compound Seasoning H* | 3.32 g |
| (or Compound Seasoning I)* | (12.39 g) |
| (or Compound Seasoning J)* | (2.18 g) |
| (or Compound Seasoning K)* | (2.20 g) |
| (or MSG) | (2 g) |
| Water | 1 l |
| Flakes of dried bonito | 10 g |
| Miso | 90 g |

*The amount added was changed so as to make the content of the L-glutamic acid salt equivalent to the content of L-glutamic acid in the control MSG.

TABLE 16

|  | Test No. 1 Compound MSG Seasoning H | | Test No. 2 Compound MSG Seasoning I | | Test No. 3 Compound MSG Seasoning J | | Test No. 4 Compound MSG Seasoning K | |
|---|---|---|---|---|---|---|---|---|
| Which is more intense in taste | 8 | 12 | 8 | 12 | 9 | 11 | 10 | 10 |
| Which is more intense in complexity | 16* | 4 | 14 | 6 | 13 | 7 | 9 | 11 |
| Which is more preferable in over-all taste | 16* | 4 | 4* | 16 | 12 | 8 | 9 | 11 |

*Significantly different at a level of significance of 5%.

EXAMPLE 4

As shown in Table 17 below, the components of four compositions were uniformly mixed to prepare compound seasonings L–P.

TABLE 17

| Compound Seasoning | Amount Incorporated |
|---|---|
| L | Potassium glutamate 203 g, Calcium chloride 111 g, GMP 1 g |
| M | MSG 187 g, Glutamic acid 14 g, Dipotassium hydrogen phosphate 17 g, Calcium carbonate 19 g, GMP 1 g |
| N | MSG 187 g, Glutamic acid 15 g, Potassium carbonate 14 g, Calcium carbonate 4 g, GMP 1 g |
| P | Glutamic acid 147 g, Potassium carbonate 49 g, Calcium hydroxide 10 g, GMP 1 g |

Thereafter, the compound seasonings were tested by a two-point comparison with MSG using miso soup as the evaluation system by a panel consisting of 20 well-trained members.

The miso soup was prepared from the composition set forth in Table 18. The organoleptic test was conducted for the qualities of taste intensity, intensity of complexity and preference of the overall taste of the miso soup.

The results are set forth in Table 19. The soup to which compound seasoning L had been added had a more intensified complexity and was significantly preferred in comparison to the soup to which MSG alone had been added. The soup to which compound seasoning M had been added had a taste worse than the soup to which MSG alone had been added and was significantly less preferred. The soups to which compound seasonings N and P had been added did not show any significant difference from MSG.

TABLE 18

| | Miso Soup |
|---|---|
| Compound Seasoning L* | 2.19 g |
| (or Compound Seasoning M)* | (2.31 g) |
| (or Compound Seasoning N)* | (2.14 g) |
| (or Compound Seasoning P)* | (2.20 g) |
| (or MSG) | (2 g) |
| Water | 1 l |
| Flakes of dried bonito | 10 g |
| Miso | 90 g |

*The amount added was changed so as to make the content of the L-glutamic acid salt equivalent to the content of L-glutamic acid in the control MSG.

TABLE 19

| | Test No. 1 Compound MSG Seasoning L | | Test No. 2 Compound MSG Seasoning M | | Test No. 3 Compound MSG Seasoning N | | Test No. 4 Compound MSG Seasoning O | |
|---|---|---|---|---|---|---|---|---|
| Which is more intense in taste | 8 | 12 | 9 | 11 | 7 | 13 | 12 | 8 |
| Which is more intense in complexity | 14 | 6 | 12 | 8 | 9 | 11 | 15* | 5 |
| Which is more preferable in overall taste | 4* | 16 | 12 | 8 | 10 | 10 | 16* | 4 |

*Significantly different at a level of significance of 5%.

EXAMPLE 5

Compound seasonings Q-T having the compositions shown in Table 20 below were prepared respectively by uniformly mixing the ingredients of each composition.

TABLE 20

| Compound Seasoning | Amount Incorporated |
|---|---|
| Q | MSG 187 g, Potassium glutamate 203 g |
| R | MSG 187 g, Potassium glutamate 41 g |
| S | MSG 187 g, Potassium glutamate 203 g, Calcium glutamate 202 g |
| T | MSG 187 g, Potassium glutamate 41 g, Calcium glutamate 40 g |

Thereafter, the compound seasonings were tested by a two-point comparison with MSG using consommé as the evaluation system by a panel consisting of 20 well-trained members.

The consommé was prepared from the composition in Table 21. The organoleptic test was conducted for the qualities of taste intensity, intensity of complexity and preference of the overall taste of the consommé.

The results are set forth in Table 22. The consommés to which compound seasonings Q and S had been added had a more intensified complexity and were significantly preferred in comparison to the consommés to which MSG alone had been added.

TABLE 21

| Starting Material | Amount Incorporated |
|---|---|
| Compound Seasoning Q* | 3.13 g |
| (or Compound Seasoning R)* | (3.04 g) |
| (or Compound Seasoning S)* | (3.17 g) |
| (or Compound Seasoning T)* | (3.07 g) |
| (or MSG) | (3 g) |
| Vegetable protein hydrolysate powder | 12 g |
| Beef extract powder | 1 g |
| Yeast extract powder | 1 g |
| Beef tallow | 0.9 g |
| Table salt | 5.4 g |
| Sugar | 3.5 g |
| Onion powder | 1.9 g |
| Celery powder | 0.3 g |
| Sea salt pepper | 0.02 g |
| Caramel powder | 0.4 g |
| Water | 1 l |

*The amount added was changed so as to make the content of the L-glutamic acid salt equivalent to the content of L-glutamic acid in the control MSG.

TABLE 22

| | Test No. 1 Compound MSG Seasoning Q | | Test No. 2 Compound MSG Seasoning R | | Test No. 3 Compound MSG Seasoning S | | Test No. 4 Compound MSG Seasoning T | |
|---|---|---|---|---|---|---|---|---|
| Which is more intense in taste | 8 | 12 | 9 | 11 | 10 | 10 | 10 | 10 |
| Which is more intense in complexity | 15* | 5 | 9 | 11 | 16* | 4 | 12 | 8 |
| Which is more preferable in overall taste | 15* | 5 | 11 | 9 | 16* | 4 | 12 | 8 |

EXAMPLE 6

Compound seasonings X–Z having the compositions of Table 23 below were prepared by uniformly mixing the ingredients of each composition.

TABLE 23

| Compound Seasoning | Amount Incorporated |
| --- | --- |
| X | MAG 187 g, Glutamic acid 198 g, Dipotassium hydrogenphosphate 171 g, Calcium hydroxide 27 g |
| Y | MSG 187 g, Potassium dihydrogenphosphate 69 g, Dipotassium hydrogenphosphate 44 g, Calcium lactate 62 g |
| Z | MSG 187 g, Glutamic acid 16 g, Calcium chloride 25 g, Calcium carbonate 6 g |

TABLE 25

|  | Test No. 1 Compound MSG Seasoning X | | Test No. 2 Compound MSG Seasoning Y | | Test No. 6 Compound MSG Seasoning Z | |
| --- | --- | --- | --- | --- | --- | --- |
| Which possesses a greater taste intensity | 9 | 11 | 8 | 12 | 11 | 9 |
| Which exhibits a more intense complexity | 16* | 4 | 15* | 5 | 16* | 4 |
| Which exhibits a preferable overall taste | 16* | 4 | 15* | 5 | 16* | 4 |

*Significantly different at a level of significance of 5%.
**Significantly different at a level of significance of 1%.

EXAMPLE 7

Seasonings a–c were prepared by uniformly mixing the ingredients shown for each composition shown in Table 26 below and then dissolving the composition in water and spray drying the solutions to obtain the compound seasonings.

TABLE 26

| Compound Seasoning | Amount Incorporated |
| --- | --- |
| a | MSG: 187 g, Glutamic acid: 2673 g, Potassium carbonate: 397 g, Calcium carbonate: 575 g |
| b | MSG: 187 g, Potassium glutamate: 1015 g, Calcium glutamate: 1010 g |
| c | MSG: 187 g, Potassium glutamate: 1015 g, Calcium glutamate: 404 g |

Thereafter, the compound seasonings were tested by a two-point comparison with MSG using chicken bone soup as the evaluation system by a panel consisting of 20 well-trained members.

The chicken bone soup was prepared from the ingredients shown in Table 24. The organoleptic test was conducted for the qualities of taste intensity, intensity of complexity and preference for the overall taste of the chicken bone soup.

The results are set forth in Table 25. The soups to which the compound seasonings X, Y and Z had been added exhibited a more intensified complexity and were significantly preferred in comparison with the soup to which MSG alone had been added.

TABLE 14

| Starting Material | Amount Incorporated |
| --- | --- |
| Compound Seasoning X* | 5.95 g |
| (or Compound Seasoning Y)* | (8.71 g) |
| (or Compound Seasoning Z)* | (5.64 g) |
| (or MSG) | (5 g) |
| Chicken bone soup stock** | 1 l |
| Table salt | 8 g |

*The amount added was changed so as to make the content of the L-glutamic acid salt equivalent to the content of L-glutamic acid in the control MSG.
**The chicken bone soup stock was prepared by adding 8 l of water to 500 g of chicken bones and 500 g of pork bones, boiling down for 3 hours, and thereafter filtering to obtain 6 l of soup.

Thereafter, the compound seasonings were tested by a two-point comparison with MSG using chicken bone soup as the evaluation system by a panel consisting of 20 well-trained members.

The chicken bone soup was prepared from the ingredients shown in Table 27. The organoleptic test was conducted for the qualities of taste intensity, intensity of complexity and preference for the overall taste of the chicken bone soup.

The results are set forth in Table 28. In those soups to which the compound seasongs b and c had been added, the complexity was significantly more intense in comparison to the soup to which MSG alone had been added, but the preference in the overall taste was equally split. The soup to which the compound seasoning a had been added had a worse taste and was significantly less preferred than the soup to which MSG alone had been added.

TABLE 27

| Starting Material | Amount Incorporated |
| --- | --- |
| Compound Seasoning a* | 5.34 g |
| (or Compound Seasoning b)* | (5.38 g) |
| (or Compound Seasoning c)* | (5.37 g) |
| (or MSG) | (5 g) |
| Chicken bone soup stock** | 1 l |
| Table salt | 8 g |

*The amount added was changed so as to make the content of the L-glutamic acid salt equivalent to the content of L-glutamic acid in the control MSG.
**The chicken bone soup stock was prepared by adding 8 l of water to 500 g of chicken bones and 500 g of pork bones, boiling down for 3 hours, and thereafter filtering to obtain 6 l of soup product.

TABLE 28

|  | Test No. 1 Compound MSG Seasoning a | | Test No. 2 Compound MSG Seasoning b | | Test No. 3 Compound MSG Seasoning c | |
| --- | --- | --- | --- | --- | --- | --- |
| Which possesses a more intense taste | 10 | 10 | 9 | 11 | 9 | 11 |
| Which exhibits a more intense complexity | 16* | 4 | 16* | 4 | 16* | 4 |
| Which is more preferred in overall taste | 4* | 16 | 9 | 11 | 12 | 8 |

*Significantly different at a level of significance of 5%.

EXAMPLE 4

Compound seasonings d–g were prepared by uniformly mixing the components of each composition as shown in Table 29 below.

TABLE 29

| Compound Seasoning | Amount Incorporated |
| --- | --- |
| d | MSG: 187 g, Dipotassium hydrogenphosphate: 29 g, Calcium |

TABLE 29-continued

| Compound Seasoning | Amount Incorporated |
|---|---|
|  | chloride: 37 g |
| e | MSG: 187 g, Glutamic acid: 25 g, Dipotassium hydrogenphosphate: 29 g, Calcium lactate: 20 g |
| f | MSG: 187 g, Potassium glutamate: 406 g, Calcium glutamate: 162 g |
| g | MSG: 187 g, Dipotassium hydrogenphosphate: 174 g, Glutamic acid: 588 g, Calcium carbonate: 200 g |

Thereafter, the compound seasonings were tested by a two-point comparison with MSG using scrambled eggs as the evaluation system by a panel consisting of 20 well-trained members.

The scrambled eggs were prepared from the ingredients shown in Table 30. The organoleptic test was conducted for the qualities of taste intensity, intensity of complexity and preference for the overall taste of the scrambled eggs.

The result are set forth in Table 31. The eggs to which compound seasoning e and f had been added had more intensified complexity and were significantly preferred in comparison to the scrambled eggs to which MSG alone had been added. The scrambled eggs to which compound seasoning g had been added had a worse taste and was significantly less preferred than the scrambled eggs to which MSG alone had been added. The scrambled eggs to which compound seasoning d had been added did not show any significant difference from MSG.

TABLE 30

|  | Miso Soup (sic) |
|---|---|
| Compound Seasoning d* | 1.35 g |
| (or Compound Seasoning e)* | (1.13 g) |
| (or Compound Seasoning e)* | (1.14 g) |
| (or Compound Seasoning f)* | (1.23 g) |
| (or MSG) | (1 g) |
| Eggs | 500 g |
| Salt | 3 g |
| White pepper | 0.5 g |
| Butter | 50 g |

*The amount added was changed so as to make the content of the L-glutamic acid salt equivalent to the content of L-glutamic acid in the control MSG.

TABLE 31

|  | Test No. 1 Compound MSG Seasoning d | | Test No. 2 Compound MSG Seasoning e | | Test No. 3 Compound MSG Seasoning f | | Test No. 4 Compound MSG Seasoning g | |
|---|---|---|---|---|---|---|---|---|
| Which possesses a more intense taste | 12 | 8 | 11 | 9 | 12 | 8 | 9 | 11 |
| Which exhibits a more intense complexity & fullness | 14 | 6 | 16* | 4 | 15* | 5 | 16* | 4 |
| Which exhibits a preferred overall taste | 13 | 7 | 16* | 4 | 15* | 4 | 5* | 15 |

*Significantly different at a level of significance of 5%.

EXAMPLE 9

Compound seasonings h–k were prepared by uniformly mixing the components of each composition as shown in Table 32.

TABLE 32

|  | Control | h | i | j | k |
|---|---|---|---|---|---|
| MSG | 4300 g | 4300 g | 4300 g | 4300 g | 4300 g |
| IN | 50 | 50 | 50 | 50 | 50 |
| Black pepper | 3000 | 3000 | 3000 | 3000 | 3000 |
| Table salt | 4500 | 1000 | 3000 | 3400 | 1300 |
| Potassium chloride |  | 3000 | 1100 | 1200 | 3400 |
| Calcium chloride |  | 1100 | 400 | 150 | 500 |
| Total | 11850 | 12450 | 11850 | 12100 | 12550 |

Thereafter, the compound seasonings were tested by a two-point comparison with MSG using scrambled eggs as the evaluation system by a panel consisting of 20 well-trained members.

The scrambled eggs were prepared from the ingredients shown in Table 33. The organoleptic test was conducted for the qualities of taste intensity, intensity of complexity and preference for the overall taste of the scrambled eggs.

The results are set forth in Table 34. The scrambled eggs to which the compound seasonings h and k had been added had more intensified complexity and were significantly preferred in comparison to the scrambled eggs to which MSG alone had been added. The scrambled eggs to which compound seasonings i and j had been added did not shown any significant difference from MSG.

TABLE 33

|  | Miso Soup (sic) |
|---|---|
| Compound Seasoning i* | 3.00 g |
| (or Compound Seasoning h)* | (3.15 g) |
| (or Compound Seasoning j)* | (3.18 g) |
| (or Compound Seasoning k)* | (3.06 g) |
| (or Control) | (3 g) |
| Eggs | 500 g |
| Salt | 1.5 g |
| Butter | 50 g |

*The amount added was changed so as to make the content of the L-glutamic acid salt equivalent to the content of L-glutamic acid in the control MSG.

TABLE 34

|  | Test No. 1 | | Test No. 2 | | Test No. 3 | | Test No. 4 | |
|---|---|---|---|---|---|---|---|---|
|  | Compound Seasoning h | Control | Compound Seasoning i | Control | Compound Seasoning j | Control | Compound Seasoning k | Control |
| Which possesses a more intense taste | 9 | 11 | 8 | 12 | 10 | 10 | 12 | 8 |
| Which exhibits a more | 15* | 5 | 13 | 7 | 11 | 9 | 15* | 5 |

EXAMPLE 10

Compound seasonings l–o were prepared by uniformly mixing the ingredients shown in Table 35 below for each composition.

TABLE 35

|  | Control | l | m | n | o |
|---|---|---|---|---|---|
| Flakes of dried bonito | 200 g | 200 g | 200 g | 200 g | 200 g |
| Table salt | 300 |  56 | 104 | 164 |  98 |
| Potassium chloride |  |  49 | 170 | 115 |  31 |
| Calcium chloride |  | 213 |  79 |  62 | 187 |
| Sodium glutamate | 295 | 295 | 295 | 295 | 295 |
| IN |   5 |   5 |   5 |   5 |   5 |
| Protein hydrolysate |  30 |  30 |  30 |  30 |  30 |
| Sugar | 170 | 170 | 170 | 170 | 170 |
| Total | 1000 | 1018 | 1053 | 1041 | 1061 |

Thereafter, the compound seasonings were tested by a two-point comparision with MSG using miso soup as the evaluation system by a panel consisting of 20 well-trained members.

The miso soup was prepared from the ingredients shown in Table 36. The organoleptic test was conducted for the qualities of taste intensity, intensity of complexity and preference for the overall taste of the miso soup.

The results are set forth in Table 37. The soups to which the compound seasonings m and n had been added exhibited a more intensified complexity and were significantly preferred in comparison to the soup to which the control had been added. The soup to which compound seasonings l and o had been added had a worse taste and were significantly less preferred than the soup to which the control had been added.

TABLE 36

|  | Miso Soup |
|---|---|
| Compound Seasoning l* | 7.13 g |
| (or Compound Seasoning m)* | (7.4 g) |
| (or Compound Seasoning n)* | (7.29 g) |
| (or Compound Seasoning o)* | (7.11 g) |
| (or Control) | (7.0 g) |
| Water | 1 l |
| Miso | 90 g |

*The amount added was changed so as to make the content of the L-glutamic acid salt equivalent to the content of L-glutamic acid in the control.

TABLE 37

|  | Test No. 1 Compound MSG Seasoning l | | Test No. 2 Compound MSG Seasoning m | | Test No. 3 Compound MSG Seasoning n | | Test No. 4 Compound MSG Seasoning o | |
|---|---|---|---|---|---|---|---|---|
| Which possesses a more intense taste | 8 | 11 | 10 | 10 | 12 | 8 | 8 | 12 |
| Which exhibits a more intense complexity & fullness | 15* | 5 | 15* | 5 | 17* | 3 | 16* | 4 |
| Which exhibits a more preferred overall taste | 4* | 16 | 15* | 5 | 16* | 4 | 3* | 17 |

*Significantly different at a level of significance of 5%.

EXAMPLE 11

Compound seasonings p–s were prepared by uniformly mixing the ingredients of the compositions shown in Table 38 below.

TABLE 38

| Compound Seasoning | Amount Incorporated |
|---|---|
| p | Potassium glutamate: 144 g, Sodium fumarate: 30 g, Calcium chloride: 4 g |
| q | Potassium glutamate: 73 g, Sodium malate: 103 g, Calcium carbonate: 5 g, Glutamic acid: 13 g |
| r | Potassium glutamate: 77 g, Sodium citrate: 170 g, Calcium chloride: 2 g |
| s | Sodium aspartate: 33 g, Potassium glutamate: 132 g, Calcium carbonate: 8 g, Glutamic acid: 24 g |

Thereafter, the compound seasonings were tested by a two-point comparison with MSG using miso soup as the evaluation system by a panel consisting of 20 well-trained members.

The miso soup was prepared from the ingredients shown in Table 39. The organoleptic test was conducted for the qualities of taste intensity, intensity of complexity and preference for the overall taste of the miso soup.

The results are set forth in Table 40. The soups to which compound seasonings p–s had been added exhibited a more intensified complexity and were significantly preferred in comparison to the soup to which MSG alone had been added.

TABLE 39

|  | Miso Soup |
|---|---|
| Compound Seasoning p* | 2.82 g |
| (or Compound Seasoning q)* | (5.56 g) |

TABLE 39-continued

|  | Miso Soup |
|---|---|
| (or Compound Seasoning r)* | (5.27 g) |
| (or Compound Seasoning s)* | (3.08 g) |
| (or MSG) | (2 g) |
| Water | 1 l |
| Flakes of dried bonito | 10 g |
| Miso | 90 g |

*The amount added was changed so as to make the content of the L-glutamic acid salt equivalent to the content of L-glutamic acid in the control MSG.

TABLE 40

|  | Test No. 1 Compound MSG Seasoning p | | Test No. 2 Compound MSG Seasoning q | | Test No. 3 Compound MSG Seasoning r | | Test No. 4 Compound MSG Seasoning s | |
|---|---|---|---|---|---|---|---|---|
| Which possesses a more intense taste | 10 | 10 | 9 | 11 | 8 | 12 | 11 | 9 |
| Which exhibits a more intense complexity & fullness | 15* | 5 | 16* | 4 | 16* | 4 | 15* | 5 |
| Which exhibits a more preferred overall taste | 15* | 5 | 15* | 5 | 15* | 5 | 16* | 4 |

*Significantly different at a level of significance of 5%.

EXAMPLE 12

Compound seasonings t, u and v were prepared by uniformly mixing the ingredients of the composition shown in Table 41 below.

TABLE 41

| Compound Seasoning | Potassium L-Glutamate Monohydrate | Sodium L-Glutamate Monohydrate | Calcium L-Glutamate Tetrahydrate |
|---|---|---|---|
| t | 65 | 30 | 5 |
| u | 90 | 10 | 0 |
| v | 98 | 2 | 0 |

Thereafter, the compound seasonings were tested by a two-point comparison with MSG using clear soup as the evaluation system by a panel consisting of 20 well-trained members.

The clear soup was prepared from the composition set forth in Table 42. The organoleptic test was conducted for the qualities of taste intensity, intensity of complexity and preference for the overall taste of the clear soup.

The results are set forth in Table 43. The soup to which the compound seasoning t or u had been added exhibited a more intensified complexity in comparison to the soup to which MSG alone had been added, and thus was significantly preferred.

TABLE 42

| Compound Seasoning t* | 21.2 g |
|---|---|
| (or Compound Seasoning u)* | (2.15 g) |
| (or Compound Seasoning v)* | (2.17 g) |
| (or MSG) | (2 g) |
| Water | 1 l |
| Flakes of dried bonito | 10 g |
| Table salt | 8 g |
| Soy sauce | 3 ml |

*The amount added was changed so as to make the content of the l-glutamic acid salt equivalent to the content of L-glutamic acid in the control MSG.

TABLE 43

|  | Test No. 1 Compound MSG Seasoning t | | Test No. 2 Compound MSG Seasoning u | | Test No. 3 Compound MSG Seasoning v | |
|---|---|---|---|---|---|---|
| Which possesses a more intense taste | 9 | 11 | 10 | 10 | 9 | 11 |
| Which exhibits a more intense complexity & fullness | 17** | 3 | 15* | 5 | 13 | 7 |
| Which exhibits a more preferred overall taste | 16* | 4 | 15* | 5 | 12 | 8 |

*Significantly different at a level of significance of 5%.
**Significantly different at a level of significance of 1%.

EXAMPLE 13

Compound seasonings w–y were prepared by uniformly mixing the ingredients of the compositions shown in Table 44 below.

TABLE 44

| Compound Seasoning | Potassium L-Glutamate Monohydrate | Sodium L-Glutamate Monohydrate | Calcium L-Glutamate Tetrahydrate |
|---|---|---|---|
| w | 80 | 15 | 5 |
| x | 30 | 35 | 35 |
| y | 25 | 75 | 0 |

Thereafter, the compound seasonings were tested by a two-point comparison with MSG with miso soup as the evaluation system by a panel consisting of 20 well-trained members.

The miso (fermented soybean paste) soup was prepared from the composition set forth in Table 45. The organoleptic test was conducted for the qualities of taste intensity, intensity of complexity and preference for the overall taste of the miso soup.

The results are set forth in Table 46. The soup to which compound seasoning w had been added had a more intensified complexity in comparison to the soup to which MSG alone had been added, and thus was significantly preferred.

TABLE 45

|  | Miso Soup |
|---|---|
| Compound Seasoning w* | 2.15 g |
| (or Compound Seasoning x)* | (2.10 g) |
| (or Compound Seasoning y)* | (2.05 g) |
| (or MSG) | (2 g) |
| Water | 1 l |
| Flakes of dried bonito | 10 g |
| Miso | 90 g |

*The amount added was changed so as to make the content of the L-glutamic acid salt equivalent to the content of L-glutamic acid in the control MSG.

TABLE 46

|  | Test No. 1 Compound MSG Seasoning w | | Test No. 2 Compound MSG Seasoning x | | Test No. 3 Compound MSG Seasoning y | |
|---|---|---|---|---|---|---|
| Which possesses a more intense taste | 10 | 10 | 11 | 9 | 9 | 11 |

TABLE 46-continued

|  | Test No. 1 Compound MSG Seasoning w | | Test No. 2 Compound MSG Seasoning x | | Test No. 3 Compound MSG Seasoning y | |
|---|---|---|---|---|---|---|
| Which exhibits a more intense complexity & fullness | 16* | 4 | 13 | 7 | 12 | 8 |
| Which exhibits a more preferred overall taste | 16* | 4 | 11 | 9 | 12 | 8 |

*Significantly different at a level of significance of 5%.

EXAMPLE 14

Compound seasonings a'-c' were prepared by uniformly mixing the ingredients of the compositions shown in Table 47 below.

TABLE 41

| Compound Seasoning | Potassium L-Glutamate Monohydrate | Sodium L-Glutamate Monohydrate | Calcium L-Glutamate Tetrahydrate |
|---|---|---|---|
| a' | 45 | 30 | 25 |
| b' | 50 | 15 | 35 |
| c' | 75 | 5 | 20 |

Thereafter, the compound seasonings were tested by a two-point comparison with MSG using consommé as the evaluation system by a panel consisting of 20 well-trained members.

The consommé was prepared from the ingredients shown in Table 48. The organoleptic test was conducted for the qualities of taste intensity, intensity of complexity and preference for the overall taste of the consommé.

The results are set forth in Table 49. The soup to which the compound seasoning a' had been added had a more intensified complexity in comparison to the soup to which MSG alone had been added, and thus was significantly preferred.

TABLE 48

| Ingredient | Amount |
|---|---|
| Compound Seasoning a'* | 3.17 g |
| (or Compound Seasoning b')* | (3.21 g) |
| (or Compound Seasoning c')* | (3.24 g) |
| (or MSG) | (3 g) |
| Vegetable protein hydrolysate powder | 12 g |
| Beef extract powder | 1 g |
| Yeast extract powder | 1 g |
| Beef tallow | 1 g |
| Table salt | 5.4 g |
| Sugar | 3.5 g |
| Onion powder | 1.9 g |
| Celery powder | 0.3 g |
| Sea salt pepper | 0.02 g |
| Caramel powder | 0.4 g |
| Water | 1 l |

*The amount added was changed so as to make the content of the L-glutamic acid salt equivalent to the content of L-glutamic acid in the control MSG.

TABLE 49

|  | Test No. 2 Compound MSG Seasoning a' | | Test No. 3 Compound MSG Seasoning b' | | Test No. 4 Compound MSG Seasoning c' | |
|---|---|---|---|---|---|---|
| Which possesses a more intense taste | 10 | 10 | 9 | 11 | 9 | 11 |
| Which exhibits a more intense complexity & fullness | 16* | 4 | 12 | 8 | 11 | 9 |
| Which exhibits a more preferred overall taste | 16* | 4 | 10 | 10 | 11 | 9 |

EXAMPLE 15

Compound seasonings d'-f' were prepared by uniformly mixing the ingredients for the compositions shown in Table 50 below.

TABLE 50

| Compound Seasoning | Potassium L-Glutamate Monohydrate | Sodium L-Glutamate Monohydrate | Calcium L-Glutamate Tetrahydrate |
|---|---|---|---|
| d' | 65 | 10 | 25 |
| e' | 45 | 55 | 0 |
| f' | 60 | 40 | 0 |

Thereafter, the compound seasonings were tested by two-point comparison with MSG using chicken bone soup as the evaluation system by a panel consisting of 20 well-trained members.

The chicken bone soup was prepared as shown in Table 51. The organoleptic test was conducted for the qualities of taste intensity, intensity of complexity and preference for the overall taste of the chicken bone soup.

The results are set forth in Table 52. The soups to which the compound seasonings d', e' and f' had been added had a more intensified complexity in comparison to the soup to which MSG along had been added, and thus were significantly preferred.

TABLE 51

| Ingredient | Amount |
|---|---|
| Compound Seasoning d'* | 5.38 g |
| (or Compound Seasoning e')* | (5.19 g) |
| (or Compound Seasoning f')* | (5.25 g) |
| (or MSG) | (5 g) |
| Chicken bone soup stock** | 1 l |
| Table salt | 8 g |

*The amount added was changed so as to make the content of the L-glutamic acid salt equivalent to the content of L-glutamic acid in the control MSG.
**The chicken bone soup stock was prepared by adding 8 l of water to 500 g of chicken bones and 500 g of pork bones, boiling down for 3 hours, and there after filtering to obtain 6 l of soup product.

TABLE 52

|  | Test No. 1 Compound MSG Seasoning d' | | Test No. 2 Compound MSG Seasoning e' | | Test No. 3 Compound MSG Seasoning f' | |
|---|---|---|---|---|---|---|
| Which possesses a more intense taste | 9 | 11 | 10 | 10 | 11 | 9 |
| Which exhi- | 15* | 5 | 17** | 3 | 17** | 3 |

| | Test No. 1 Compound MSG Seasoning d' | | Test No. 2 Compound MSG Seasoning e' | | Test No. 3 Compound MSG Seasoning f' | |
|---|---|---|---|---|---|---|
| bits a more intense complexity & fullness Which exhibits a more preferred overall taste | 16* | 4 | 15* | 5 | 16* | 4 |

*Significantly different at a level of significance of 5%.
**Significantly different at a level of significance of 1%.

EXAMPLE 16

Sodium L-glutamate crystals and calcium L-glutamate crystals were respectively pulverized in a pinmill pulverizer to obtain finely powdered sodium L-glutamate and finely powdered calcium L-glutamate of an average particle size of 100 μm each.

To 65 parts by weight of potassium L-glutamate crystals were added and mixed 30 parts by weight of the finely powdered sodium L-glutamate and 5 parts by weight of the finely powdered calcium L-glutamate. Thereafter, 7 parts by weight of water was added, and the mixture was kneaded on a kneader and dried in a fluidized bed to obtain a compound seasoning of the present invention.

As a control, a seasoning was prepared by not conducting the above pulverization, but rather pelletization was used. The physical properties and appearances of the product of the present invention and the control product were compared and evaluated. The results are given in Table 53.

TABLE 53

| | Product by Stirred Coating Pelletization | Control Product |
|---|---|---|
| Apparent Specific Volume (cc/g) | 1.6 | 1.3 |
| Dissolving Rate*[1] (22° C.) | 240 sec | 360 sec |
| Flow Characteristics | Has flowability | Agglomerated |
| Appearance | White | Crystalline |
| | | brilliance |

*[1]100 cc of water is added to a 200 cc beaker. While mildly stirring the water using a magnetic stirrer, 10 g of the sample was added and the time for dissolution of the solids was measured.
*[2]The sample was left in a constant-temperature constant-humidity chamber at 34° C. and a relative humidity of 74% for 24 hours, and measured.

As shown in Table 53, the granular compound seasoning of the present invention has a rapid dissolving rate and is rich in flow characteristics.

As is clear from the above results, the compound seasonings of the present invention are of extremely satisfactory quality by virtue of the unprecedented organoleptic and physical properties which they exhibit.

Having now fully described this invention, it will be apparent to one of ordinary skill in the art that many changes and modifications can be made thereto without departing from the spirit or scope of the invention as set forth herein.

What is claimed as new and is intended to be secured by Letters Patent is:

1. A glutamate compound seasoning composition, which comprises a mixture of
   glutamic acid,
   a first edible salt containing Na ions as a coating which is selected from the group consisting of Na glutamate, Na glutamate monohydrate, NaCl, NaOH, Na phosphates, and Na carbonates, wherein said sodium salt is pulverized to a size of 200 microns or less, and
   a second edible salt containing K ions which is selected from the group consisting of K glutamate, K glutamate monohydrate, KCl, KOH, K phosphates, and K carbonates, wherein said second edible salt is not pulverized,
   wherein the gram equivalent of Na:K is 1:4 to 5:2 and the number of moles of glutamic acid: the total gram equivalent number of K and Na is 0.1:1 to 1.2:1.

2. The composition of claim 1 further comprising a third edible salt containing calcium ions, wherein said third edible salt is selected from the group consisting of Ca glutamate, Ca glutamate monohydrate, $CaCl_2$, Ca(OH)$_2$, Ca phosphates and Ca carbonates, wherein the gram equivalent number ratio of calcium ion to potassium ion is less than 1.5.

3. The composition of claim 1 comprising 30–95% by weight of potassium L-glutamate and 5–70% by weight of sodium L-glutamate.

4. The composition of claim 2 comprising 65 parts by weight of potassium L-glutamate, 30 parts by weight of sodium L-glutamate, and 5 parts by weight of calcium L-glutamate.

* * * * *